United States Patent [19]

Moss et al.

[11] 4,431,143
[45] Feb. 14, 1984

[54] SLIDING DRAG SYSTEM

[75] Inventors: Elvis W. Moss; John J. Mack, both of Tulsa, Okla.

[73] Assignee: Brunswick Corporation, Skokie, Ill.

[21] Appl. No.: 439,366

[22] Filed: Nov. 4, 1982

[51] Int. Cl.³ .............................................. A01K 89/02
[52] U.S. Cl. .............................................. 242/84.5 A
[58] Field of Search ...................... 242/84.5 A, 84.5 R, 242/84.51 A, 84.51 R, 84.2 A, 84.2 R, 84.21 A, 99; 188/70 R, 73.43

[56] References Cited
U.S. PATENT DOCUMENTS

| 3,061,231 | 10/1962 | Gayle | 242/84.2 A |
| 3,836,092 | 9/1974 | Hull | 242/84.2 A |
| 3,900,167 | 9/1975 | Hull | 242/84.5 A |

Primary Examiner—Billy S. Taylor
Attorney, Agent, or Firm—John G. Heimovics

[57] ABSTRACT

A sliding drag assembly for a spin casting style fishing reel comprising a clutch ring, disposed between a deck plate, associated with the reel body, and a line-carrying spool. Brake washers may be mounted between the clutch ring and the spool. The clutch ring comprises a substantially flat body with a plurality of legs or cam followers extending angularly from the plane of the body and toward the deck plate. The deck plate has a plurality of ramps or cams corresponding in number and location with the legs or cam followers. Translation of the clutch ring guides the legs or cam followers on the ramps or cams, moving the body forwardly or rearwardly of the reel, depending on the direction of movement of the clutch ring. Preferably, the body and legs are formed as a single piece from a sheet of resilient material, as is a tab, which is folded at a right angle to the plane of the body and through which the ring is manipulated. A drag actuator operatively engages the tab and is threadably engaged with a post attached to a star wheel. Rotation of the star wheel and post effects translational movement of the ring transverse to the axis of the reel whereby the cams and cam followers increase or decrease the drag on the spool.

10 Claims, 6 Drawing Figures

U.S. Patent  Feb. 14, 1984  Sheet 2 of 2  4,431,143
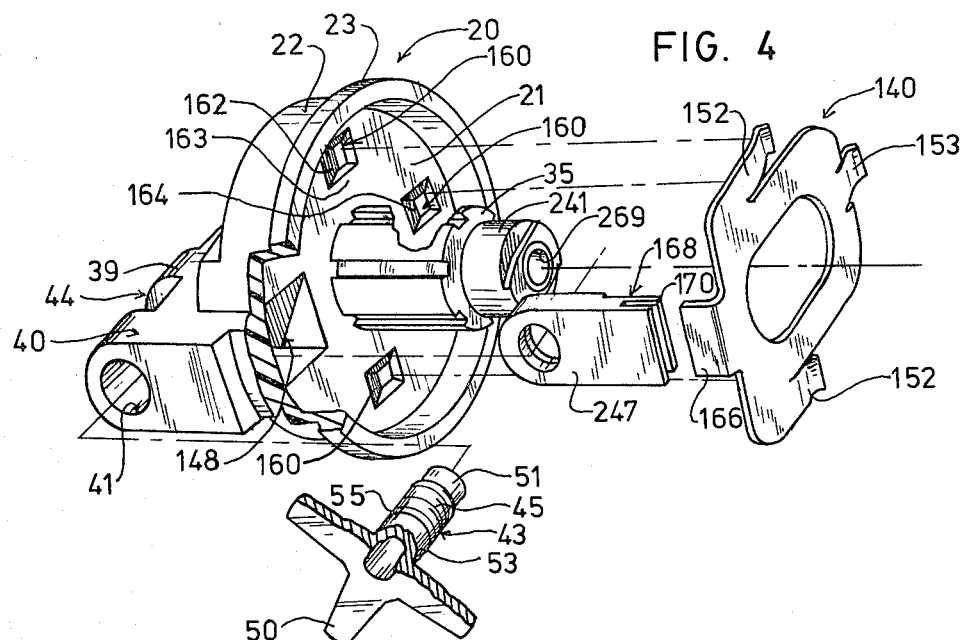
FIG. 4
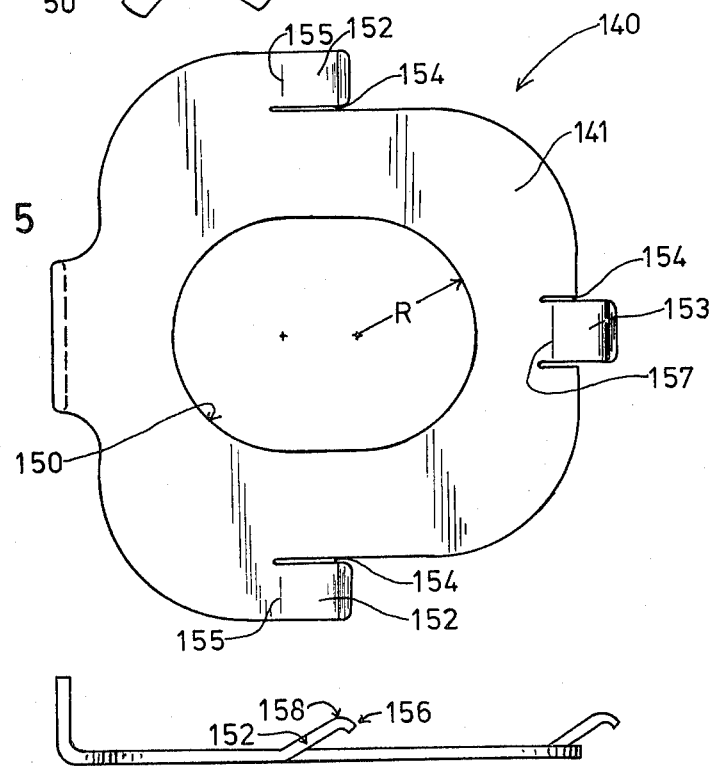
FIG. 5
FIG. 6

SLIDING DRAG SYSTEM

DESCRIPTION

Technical Field

This invention relates to a spin casting style fishing reel and, more particularly, relates to a spin casting style fishing reel incorporating a unique drag system actuated by sliding movement of a clutch ring.

Background Art

To control the pressure, or drag on a line-carrying spool, a plate or the like, mounted concentrically about a shaft, is often advanced or retracted lengthwise of a reel. Rotation of the spool is inhibited by the plate bearing either directly on the spool or on a brake washer bearing on the spool.

In one form of actuator, manipulation of the plate is accomplished by a drag actuator. The plate, which is bowed or flexed out of the plane of the plate and is referred to as a drag plate, is provided on one side with a laterally extending ramp with a rearwardly facing tab engageable with the drag actuator. A mechanism is provided to shift the drag actuator laterally, thereby permitting engagement of the actuator along an extent of the ramp to apply pressure at a spot or along a line to the spool which may produce a bending moment to the spool boss. More or less pressure is applied to the spool depending upon the position of the actuator along the ramp.

The drag plate is subjected to a large bending moment. Consequently, the drag plate must be constructed from a fairly thick material to avoid possible deformation which might otherwise interfere with the operation of the remainder of the reel mechanism.

Further, after prolonged use, the localized pressure between the spool, the brake ring or washer and the drag plate might cause wear at the contacting portions of the parts. The plate might tend to gouge the brake ring or the rotating spool since the plate contacts at a spot or along a line.

Other types of drag systems apply a drag on the lip of one flange of the spool (Sarah U.S. Pat. No. 2,911,165), apply drag internally of the spool hub (Hull U.S. Pat. No. 3,481,554) or have a dome shaped plate actuated by a thumb button (Christensens U.S. Pat. No. 3,697,011).

The present invention is directed to overcoming the above-enumerated problems.

Disclosure of the Invention

The present invention comprises a drag mechanism for inhibiting rotation of a line-carrying spool relative to a reel body including a deck plate. A clutch ring is disposed between the deck plate and the spool. The ring has a planar body portion and a plurality of integrally formed cam followers or legs extending out of the plane of the body portion and towards the deck plate. The cam followers or legs are guided by a corresponding number of cams or ramps in the deck plate to adjust the drag as the ring is moved transversely to the length of the reel. The translation of the legs along the ramp causes the body to move either forwardly or rearwardly, depending on the direction of movement of the ring. The body bears on brake rings or on the spool, with the applied pressure of the ring thereon determining the drag.

It is the principal object of the invention to cause a relatively even pressure to be applied between the clutch ring and the spool either directly or through a brake ring to effect a smooth drag function. With the above arrangement, the pressure is applied about the body of the ring, preferably through an arc in excess of 180°. The pressure range is determined by the arrangement of the legs which transmit the force between the deck plate and the spool. At all drag settings, this same pressure distribution occurs. As a result, the bending moment on the clutch ring is substantially reduced.

It is another object of the invention to provide a drag mechanism that can be simply and cheaply constructed. The entire clutch ring in one preferred form is fabricated from a single piece of sheet material. The legs are formed by a plurality of parallel slits in the body, with the legs folded out about lines transverse to the length of the slits. The cooperating ramps may be molded directly into the deck plate.

It is an additional object to provide a drag mechanism that is positively and smoothly operable by the user throughout the permissible drag range. A control tab is bent out of the plane of the ring preferably at a right angle and towards the deck plate. An actuating member engages the tab, which resides in a plane transverse to the line of motion of the actuator. The actuator is threadably engaged with an exteriorly rotatable wheel for lateral movement of the actuator, and the ring when the actuator operatively engages the tab on the ring.

The ring is further guided by providing an oval slot in the ring which fits closely about a hub integrally formed with and protruding forwardly of the deck plate. The oval configuration permits translational movement of the ring as is required to adjust the drag. The legs are also curved at their free ends to provide a rounded guiding surface over the ramps. This prevents the legs from snagging as they translate.

Various modifications and changes may be made with regard to the foregoing detailed description without departing from the spirit of the invention.

Brief Description of the Drawings

FIG. 4 is an exploded perspective view of a portion of the internal mechanism of the reel including the drag mechanism;

FIG. 5 is an enlarged, elevational end view of the clutch ring; and

FIG. 6 is an enlarged top view of the clutch ring of FIG. 5.

Best Mode for Carrying Out the Invention

Figure 1:
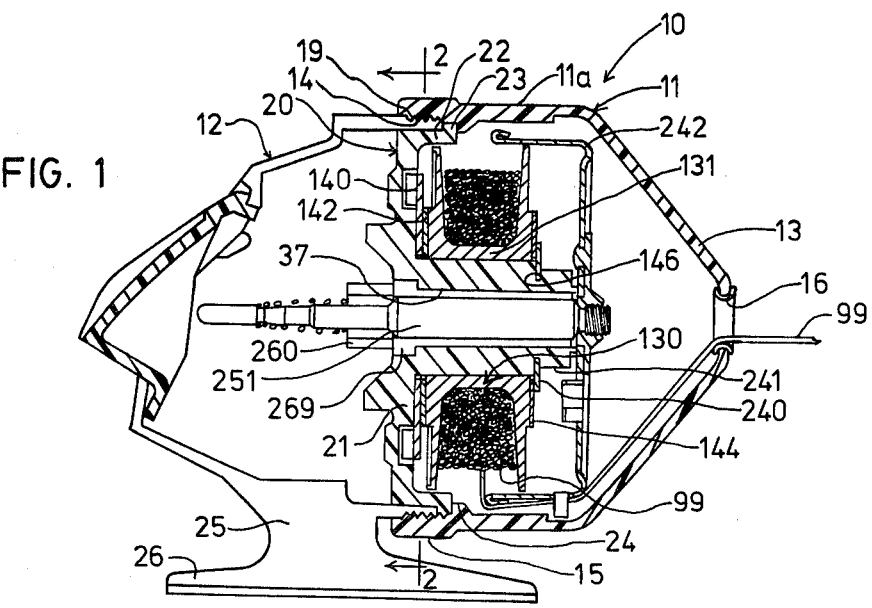
FIG. 1 is a cross-sectional side elevational view a spin casting reel incorporating a preferred form of the drag mechanism of the present invention.
Figure 3:
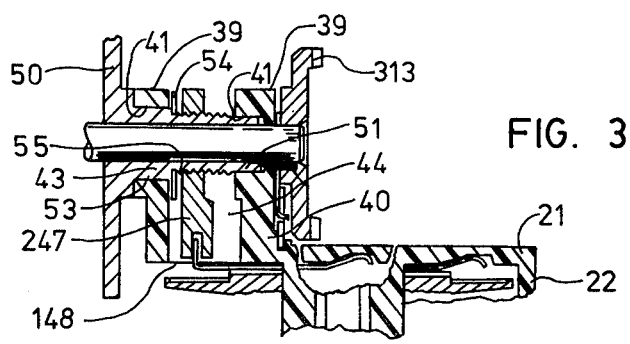
FIG. 3 is a partial cross-sectional view of a mechanism for actuating the clutch ring taken along line 3—3 of FIG. 2.
Figure 2:
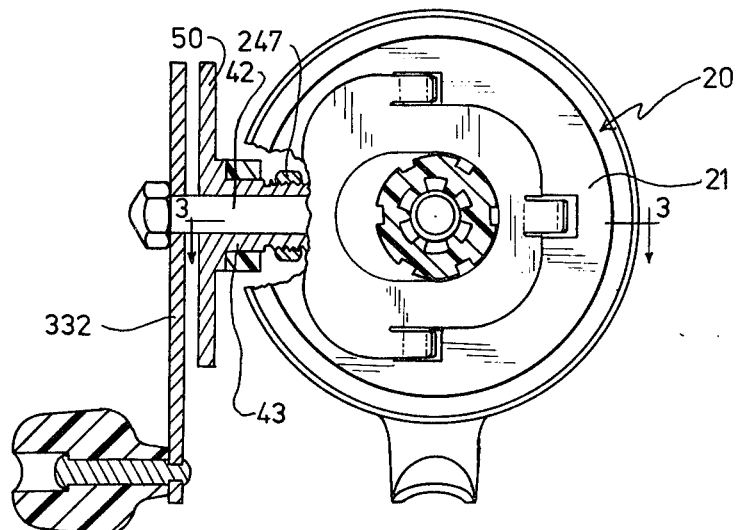
FIG. 2 is a cross-sectional end view taken along line 2—2 of FIG. 1 showing the reel with the reel mechanism forward of a clutch ring on the drag mechanism removed.

Referring initially to FIG. 1, there is shown a reel, including a closed face housing 10, having joinable front and rear cup-shaped covers, 11 and 12, respectively. The front cover 11 has a ring or cylindrically-shaped first portion 11a and a conical front portion 13. The front cover 11 may be molded from a high impact strength plastic, such as ABS, or may alternatively be formed of metal, such as aluminum. The rear cover 12 may be formed of a platable grade ABS with a chrome or nickel plating. The conical front portion 13 includes a circular line opening which mounts an annular line guide 16 in a known manner. The cylindrical first portion 11a of the front cover 11 has helical threads 14 formed on the rearmost internal surface thereof and has knurled gripping portions 15 formed on the external surface to facilitate assembly of the housing 10.

As illustrated in FIGS. 1-4, a reel body 20 is provided and includes a circular mounting plate or deck plate 21 which has a forwardly extending cylindrical sleeve portion 22 integrally formed around the outer periphery thereof. The reel body 20 may be made of plastic material, such as ABS or a glass filled polycarbonate. The forward edge of the sleeve 22 has a flange 23 extending radially outwardly beyond the outer surface of the sleeve portion 22. The cylindrical first portion 11a of the front cover 11 is undercut forwardly of the internal thread 14 to provide a rearwardly facing shoulder 24 axially spaced from the end of the internal thread 14. The rear cover 12 is adapted to receive the reel body 20 with the radially extending flange 23 bearing against the forward edge of the rear cover. The front cover 11, with the rear open portion aligned with the rear cover has the threaded portion 14 engaging with the external thread 19 on the rear cover and is threaded onto the external thread 19 until the forwardly facing edge of the flange 23 engages the shoulder 24 at the end of the thread 14 to trap the reel body 20 between the front cover 11 and the rear cover 12. The rear cover 12 has an integrally molded, radially extending stem 25 with a mounting foot 26 on the outer end thereof for attachment to the appropriate part of a fishing rod. The mounting foot 26 is to be attached to the upper surface of a fishing rod for use.

A central hub 35 is carried by and projects forward of the deck plate 21, concentric with the sleeve 22, with a clutch ring 140, back fiber washer 142, spool assembly 130, and front fiber washer 144, all consecutively retained on the hub 34 by means of spool retainer clip 240. The clip 240 fits into an annular groove 146 aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The deck plate 21 also includes a rearwardly projecting boss 40 having spaced apart legs 39 with aligned transverse openings 41 therethrough for receiving a cylindrical post 43. The boss 40 has a slot 44 between the legs 39, which slot 44 extends transverse to the axis of the openings 41. The slot 44 aligns with a slot 148 in the deck plate 21 with a slide drag actuator 247 positioned in the slot 44 and being threadably engaged with a threaded portion 45 of the post 43. The drag actuator 247 extends through the aligned slots 44, 148 and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss 40 without the post 43 moving axially relative to the boss 40.

A crank 332 is keyed to a crankshaft 42 which passes through the post 43 and mounts a gear 313 in mesh with a pinion gear 260 on the centershaft so that rotation of the crank will rotate the centershaft and spinner head 242.

Description of the Preferred Embodiment

The details of the drag assembly, wherein the present invention resides, can be seen most clearly in FIGS. 2-6 in conjunction with FIG. 1. The clutch ring 140 bears against the back fiber washer or brake ring 142 which in turn bears against the spool assembly 130, and the front fiber washer or brake ring 144, all of which are backed against the fixed retainer clip 240. As the ring 140 is urged forwardly, the pressure, or drag, on the spool 131 increases. Conversely, rearward shifting of the plate 140 decreases the drag on the spool 130.

The clutch ring 140 is preferably formed as a flat, single piece from a sheet of resilient metal with the body 141 taking the shape generally of a rectangle. The central portion of the ring 140 is provided with an oval cutout 150. The radius R (FIG. 5) of the cutout 150 is approximately that of the central hub 35 about which the plate 140 is closely fit. The oval configuration of the cutout 150 permits lateral movement of the ring 140 relative to the body 20, as is required to actuate the drag mechanism, which is described below.

Integrally formed with the ring body 141 from the same sheet are a plurality of guide legs or cam followers, to include upper and lower legs 152 and a third leg 153 intermediate to and laterally offset from the other legs 152. Each of the legs 152, 153 is defined by a pair of parallel, laterally extending spaced slots 154 passing through the ring 140. Each leg 152,153 is folded out of the plane of the ring 140, towards the deck plate 21, about a vertical fold line 155, 157, respectively. In a preferred form, each leg 152, 153 diverges from the plane of ring 140 at or about a 30° angle.

Each of the legs 152, 153 is similarly configured and is described relative to the representative upper leg 152 (FIG. 6). The free end 156 of each leg 152,153 is curved away from the deck plate 21 as to define a rounded guiding surface 158.

Within the reel body 20 are provided a plurality of recesses or cams 160, corresponding in number and location to the guide legs 152, 153. Each recess or cam 160 has a laterally extending ramp 162 tapering from the rearwardly facing surface 163 of the deck plate 21 to a forwardly facing wall 164 at the bottom of each recess 160. The bottom wall 164 is offset rearwardly from the forward deck plate surface 163 and laterally from the ramp 162 and away from the drag actuator 247.

The ramps 162 guide the legs 152, 153 of the clutch ring 140 as the ring is moved laterally. Movement of the ring 140 laterally, or to the left in FIG. 3, directs the rounded guide surfaces 158 on the cam follower up the ramp 162 of cam 160, thereby exerting a forward pressure on the clutch ring 140 in the vicinity of the fold lines 155, 157. Preferably, the ends 158 of each leg 152, 153 are curved about a vertical line so that the guide surfaces 158 are flush to the ramp 162 along the height of the legs 152, 153 as the ring is manipulated. It can be seen that in the described arrangement the legs 152, 153 exert a force on the ring 140 about an arc in excess of 180° so that drag pressure is relatively evenly distributed on the brake ring 142 and thus on the spool 130.

To laterally shift the clutch ring 140, a control arm or tab 166 is bent rearwardly out of the plane of the ring 140 opposite the intermediate leg 153, as to make approximately a right angle with the body 141 of the ring 140. The drag actuator 247 has a bifurcated end 168, defining a slot 170 to closely receive the control arm or tab 166. The arrangement of the slot 170 and tab 166 accommodates longitudinal shifting of the clutch ring 140 as the drag is varied. The drag actuator 247 is advanced or moved radially inwardly (decreased drag) by rotating the star wheel in one direction and is retracted or moved radially outward (increased drag) by rotating the star wheel 50 in the opposite direction.

The clutch ring 140, due to the cam followers 152, 153 advancing the body 141 at spaced locations of the body, moves the body of the clutch ring as a plane toward and away from the brake washer and spool. That is, the clutch ring 140 applies pressure evenly to the spool in an axial direction so as to prevent applying bending moments to the spool. The planar application of pressure also provides even wear to the spool and to the associated parts. It should be noted that the tab 161 on the clutch ring 140 and its mating slot 170 in the actuator 247 will have sufficient overlapping relationship to accommodate some axial movement of the clutch ring 140 relative to the actuator. The cut out 150 permits movement of the clutch ring 140 relative to the hub 35 in a direction transverse to the axis of the hub which movement, due to the cam followers 152,153 and cams 160, also produces a movement along the axis of the hub thereby producing the planar application of uniform pressure (drag) to the spool.

Various modifications and changes may be made with regard to the foregoing detailed description without departing from the spirit of the invention.

What is claimed is:

1. In a spinning reel having a body portion with a deck plate, a forwardly extending hub associated with the body portion and a line-carrying spool, rotatable about an axis lengthwise of the reel, a drag mechanism comprising:
   a clutch ring including a cutout within which said hub is received;
   first means for moving said clutch ring in a line transversely to the rotational axis of the spool;
   second means for progressively guiding said clutch ring lengthwise in a forward direction when the guide ring is moved by the first means in one direction, and in a rearward direction when the clutch ring is moved by the first means oppositely to the one direction;
   said clutch ring exerting a drag on the spool, said drag being variable depending upon the longitudinal position of said clutch ring as determined by said first and second means.

2. The drag mechanism of claim 1 wherein said clutch ring comprises a body residing substantially within a plane, said second means comprise a plurality of legs associated with the body and extending out of the plane of the body and toward the deck plate, and a plurality of ramps associated with said deck plate, said ramps guiding the legs and body in the forward or rearward direction as said clutch plate is slid by said first means.

3. The drag mechanism of claim 1 wherein said clutch ring comprises a body residing substantially within a plane, a tab associated with said body extends out of the plane and towards said deck plate and in a second plane, and said second means comprises an actuator member engaging said tab and a third means for moving said actuator member transversely to the second plane.

4. The drag mechanism of claim 1 wherein said cutout is substantially oval, said cutout permitting said clutch ring to be moved transverse to the hub by said first means.

5. The drag mechanism of claim 2 wherein said legs are integrally constructed with the body and are resilient to permit flexing in the forward and rearward direction relative to the body.

6. In a spinning reel having a body portion with a deck plate, a forwardly extending hub associated with the body portion, and a line-carrying spool rotatable about an axis lengthwise of the reel, a drag mechanism comprising:
   a one-piece clutch ring fabricated from a resilient flat material;
   a first portion of said clutch ring residing substantially within a plane transverse to the rotational axis of the spool;
   a plurality of legs folded angularly out of the plane of said first portion and toward said deck plate;
   first means for moving said clutch ring in a line transversely to the rotational axis of the spool; and
   a plurality of ramps coinciding with each said leg and tapering such that said legs are longitudinally guided by said ramps in a forward direction when the clutch ring is moved by the first means in one direction and in a rearward direction when the clutch ring is moved by the first means in a second direction;
   said clutch ring exerting a drag on the spool, said drag being variable and depending upon the longitudinal position of said clutch ring as determined by said first means.

7. The drag mechanism of claim 6 wherein each said leg has a free end curved back towards the plane of the first portion of the clutch ring as to define a rounded surface facing said deck plate, each said rounded surface engaging and guiding the legs along the ramp as the clutch ring is moved by said first means.

8. The drag mechanism of claim 6 wherein said clutch ring has a cutout to accommodate the hub and said legs are disposed about said clutch ring and cooperatively make an arc about said cutout in excess of 180°.

9. The drag mechanism of claim 6 wherein said legs are defined by a plurality of parallel slits in said body and each said leg is folded out of the plane of the body about a line transverse to the slits.

10. The drag mechanism of claim 6 wherein a tab is folded away from the body and towards the deck plate and said first means comprise an actuator member engaging said tab for sliding movement of said clutch ring.

* * * * *